United States Patent [19]
Björkengren

[11] Patent Number: 5,939,866
[45] Date of Patent: Aug. 17, 1999

[54] PREREGULATED DC-TO-DC CONVERTER

[75] Inventor: Ulf Björkengren, Bjärred, Sweden

[73] Assignee: Telefonaktiebolaget L M Ericsson, Stockholm, Sweden

[21] Appl. No.: 09/057,368

[22] Filed: Apr. 8, 1998

[30] Foreign Application Priority Data

Apr. 10, 1997 [SE] Sweden .................................. 9701323

[51] Int. Cl.⁶ .................................................. G05F 1/563
[52] U.S. Cl. ............................ 323/266; 323/222; 363/60
[58] Field of Search ..................................... 323/222, 266, 323/282; 363/59, 60

[56] References Cited

U.S. PATENT DOCUMENTS

| | | | |
|---|---|---|---|
| 4,618,812 | 10/1986 | Kawakami | 323/266 |
| 4,980,810 | 12/1990 | McClanahan et al. | 363/16 |
| 5,436,550 | 7/1995 | Arakawa | 323/222 |
| 5,446,367 | 8/1995 | Pinney | 323/266 |
| 5,757,170 | 5/1998 | Pinney | 323/266 |
| 5,831,418 | 11/1998 | Kitagawa | 323/222 |

FOREIGN PATENT DOCUMENTS

| | | |
|---|---|---|
| 0 325 147 A2 | 7/1989 | European Pat. Off. . |
| 0 399 561 A2 | 11/1990 | European Pat. Off. . |
| 0 700 146 A1 | 3/1996 | European Pat. Off. . |
| 63-228809 | 9/1988 | Japan . |

OTHER PUBLICATIONS

*Maxim +12v., 30mA Flash Memory Programming Supply*, Dec. 1992, 1, 3–4.

Primary Examiner—Jeffrey Sterrett
Attorney, Agent, or Firm—Jenkens & Gilchrist, P.C.

[57] ABSTRACT

A method and an arrangement for controlling the output voltage (V2) of a DC-to-DC converter (100). The DC-to-DC converter (100) comprises converting means (101) and regulating means (102). The converting means is fed by a first DC-voltage (V1) from the regulating means. The first DC-voltage (V1) is determined by a feed back portion (VDIV) of the output voltage (V2) from the converting means and a reference voltage (VREF). The reference voltage is derived from a pulse train (PT1). The output voltage (V2) depends on both the first DC-voltage (V1) and the pulse train (PT1). The output voltage (V2) from the DC-to-DC converter is kept constant under varying load and the output voltage level can be adjusted in an easy and flexible manner by the pulse train.

17 Claims, 4 Drawing Sheets

PREREGULATED DC-TO-DC CONVERTER

TECHNICAL FIELD OF THE INVENTION

The invention relates to a method and an arrangement for controlling the output voltage of a DC-to-DC converter.

DESCRIPTION OF RELATED ART

On a printed circuit board in e.g. a mobile phone different electronic devices (e.g. LCD, digital signal processor etc) may need to be fed with different supply voltages. These different supply voltages are often generated from a single DC-power source, e.g a battery, by DC-to-DC converters. A problem with these converters is that they very often have a rather high output impedance, which results in a change of their output when the load changes. To ensure that the output voltage does not change when the load changes some kind of regulation circuit must be applied. In addition, some circuitry needs to be fed with different output voltage levels at different times. For an example, the supply voltage to a LCD display typically needs to be adjusted according to the temperature. This implies the need for an easy and flexible way of adjusting the output voltage level of the DC-to-DC converter to different levels.

One known way to implement this regulation circuit, in connection with a DC-to-DC converter whose output voltage depends on the pulse frequency of a pulse train applied a: input to the DC-to-DC converter, is to feed-back the DC-to-DC converter output voltage via an A/D-converter to a micro controller. The micro controller then adjusts the parameters of the pulse train generator such that the desired output voltage from the DC-to-DC converter is maintained. Two disadvantages of this solution is that it requires an A/D-converter and the extra processing burden on the micro controller.

Japanese patent abstract JP 63-228.809 discloses an arrangement for securing a constant output voltage level from a DC-to-DC converter. The output voltage of the DC-to-DC converter is fed back via a voltage divider and applied to an inverting input terminal of an operational amplifier. An input voltage is applied to a non-inverting input terminal of the operational amplifier. The operational amplifier controls the supply voltage to the DC-to-DC converter so that the output voltage level of the DC-to-DC converter is kept at a constant relation with the input voltage applied to the non-inverting input terminal of the operational amplifier. The patent abstract provides no details on how to adjust the output voltage to different levels.

The datasheet for the MAX662 regulated charge pump DC-to-DC if converter from Maxim, discloses that in the MAX662 circuit energy is accumulated in a set of charge-pump capacitors and then transferred to an output capacitor building up an output voltage over that capacitor. The MAX622 circuit comprises an oscillator providing pulses that controls the energy transfer form the charge-pump capacitors to the output capacitor. Regulation of the output voltage from the MAX622 circuit is provided by a pulse-skipping scheme that monitors the output voltage level and turns on the charge pump, i.e. enables the oscillator, when the output voltage begins to drop and turns off the charge pump, i.e. disables the oscillator, when the correct output voltage is reached. The MAX662 circuit provides a fixed +12 V output voltage i.e. the output voltage level can not be adjusted.

A frequency-to-voltage converter could be regarded as performing some kind of DC-to-DC converting, since the frequency-to-voltage converter is fed by one DC-voltage and on its output terminal a second DC-voltage is produced whose value depends on the frequency of a signal applied to an input terminal. However, the frequency-to-voltage converter is, unlike an DC-to-DC converter, not intended to provide supply current to other circuits but is only intended to produce a voltage that can be sensed by other circuits and be used as a measure of the frequency of the applied signal to its input terminal. Furthermore, the frequency-to-voltage converter can also not provide an output voltage level above the supply voltage level.

SUMMARY OF THE INVENTION

The problem dealt with by the present invention is how to provide a DC-to-DC converter whose output voltage does not vary with the connected load and whose output voltage level can be adjusted in an easy and flexible manner.

The problem is solved essentially by a method and arrangement in which an internal converting means of the DC-to-DC converter is fed by a first. DC-voltage. This first DC-voltage is determined by a comparision of a fed back portion of the output voltage from the converting means and a reference voltage. The reference voltage is derived from a pulse train.

More specifically, the problem is solved in the following manner. The DC-to-DC converter comprises the converting means and a regulating means. A first pulse train and the first DC-voltage is received by the converting means, which generates a second DC-voltage being the output voltage from the DC-to-DC converter. The second DC-voltage is depending on both the first DC-voltage and the first pulse train. The output voltage from the DC-to-DC converter, i.e. the second DC-voltage, is fed back to the regulating means. The regulating means compares a portion of the fed back second DC-voltage with the reference voltage and generates the first DC-voltage such that said portion of the second DC-voltage is forced towards the reference voltage level. The regulating means receives a second pulse train from which the reference voltage is generated.

According to one embodiment of the invention, the second pulse train, received by the regulating means, is essentially the same as the first pulse train, received by the converting means.

One intention of the invention is to provide a method and arrangement enabling the output voltage from the DC-to-DC converter to be maintained at a constant level regardless of the connected load.

Another intention of the invention is to provide a method and arrangement which in an easy and flexible manner enables the output voltage level of the DC-to-DC converter to be adjusted.

One advantage afforded by the invention is that the output voltage of the DC-to-DC converter can be kept at a constant level even if the load varies.

Another advantage is that the output voltage level of the DC-to-DC converter can be adjusted in an easy and flexible manner.

The invention will now be described in more detail with reference to exemplifying embodiments thereof and also with reference to the accompanying drawings.

DETAILED DESCRIPTION OF THE EMBODIMENTS

Figure 1:
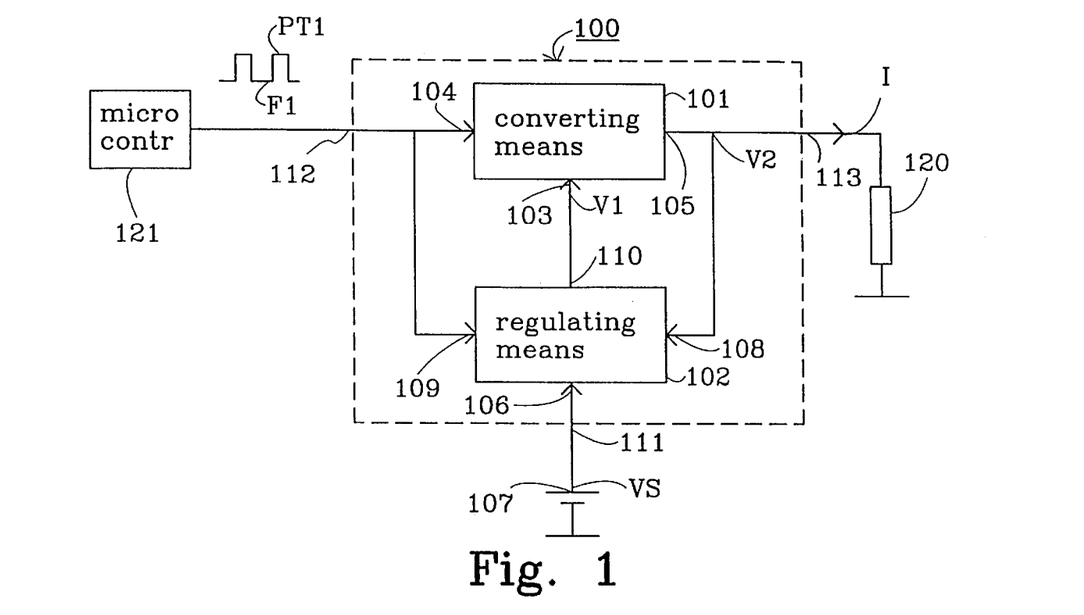
FIG. 1 shows a block diagram of an arrangement according to the invention.

FIG. 1 illustrates how a DC-to-DC converter 100 according to one embodiment of the invention is used to supply power to a load 120, e.g. an LCD-display. The load 120 may both be varying, i.e. a current I extracted from the DC-to-DC converter 100 may vary, and require to be fed by the DC-to-DC converter 100 with different voltage V2 at different times.

The DC-to-DC converter 100 has a first input terminal 111 a second input terminal 112 and an output terminal 113. The DC-to-DC converter 100 comprises converting means 101 and regulating means 102.

The converting means 101 has a first input terminal 103, a second input terminal 104 and an output terminal 105. The second input terminal 104 of the converting means 101 is connected to the second input terminal of the DC-to-DC converter 100 and the output terminal 105 of the converting means 101 is connected to the output terminal 113 of the DC-to-DC converter 100. The converting means 101 receives a first DC-voltage V1 on the first input terminal 103. The converting means receives a first pulse train PT1 on the second input terminal 104 via the second input terminal of the DC-to-DC converter 100. The first pulse train PT1 has a pulse frequency F1.

The converting means emits the voltage V2, hereinafter denoted as second DC-voltage V2, on the output terminal 105. This second DC-voltage V2 is emitted to the load 120 via the output terminal 113 of the DC-to-DC converter 100. The second DC-voltage V2 depends on both the first DC-voltage V1 and the frequency F1 of the first pulse train PT1. The converting means may e.g. be implemented as a capacitor based charge pump or a coil based charge pump. See FIG. 4 and FIG. 5 respectively.

The regulating means 102 has a first input terminal 106, connected to the first input terminal 111 of the DC-to-DC converter 100, for receiving a supply voltage VS from a DC-power source 107. The DC-power source 107 is typically a battery.

The regulating means 102 further has a second input terminal 108, connected to the output terminal 105 of the converting means 101, for sensing the second DC-voltage V2 emitted by the converting means 101.

The regulating means 102 has a third input terminal 109 for receiving a second pulse train. In this specific embodiment, the second input terminal 104 of the converting means 101 and the third input terminal 109 of the regulating means 102 are joined together and hence the second pulse train is identical with the first pulse train PT1. The regulating means 102 also has an output terminal 110 connected to the first input terminal 103 of the converting means 101. The regulating means 102 compares a portion of the sensed second DC-voltage V2 with a reference voltage (VREF, see FIG. 2) and generates on the output terminal 110 the first DC-voltage V1 supplied to the converting means 101.

Figure 2:
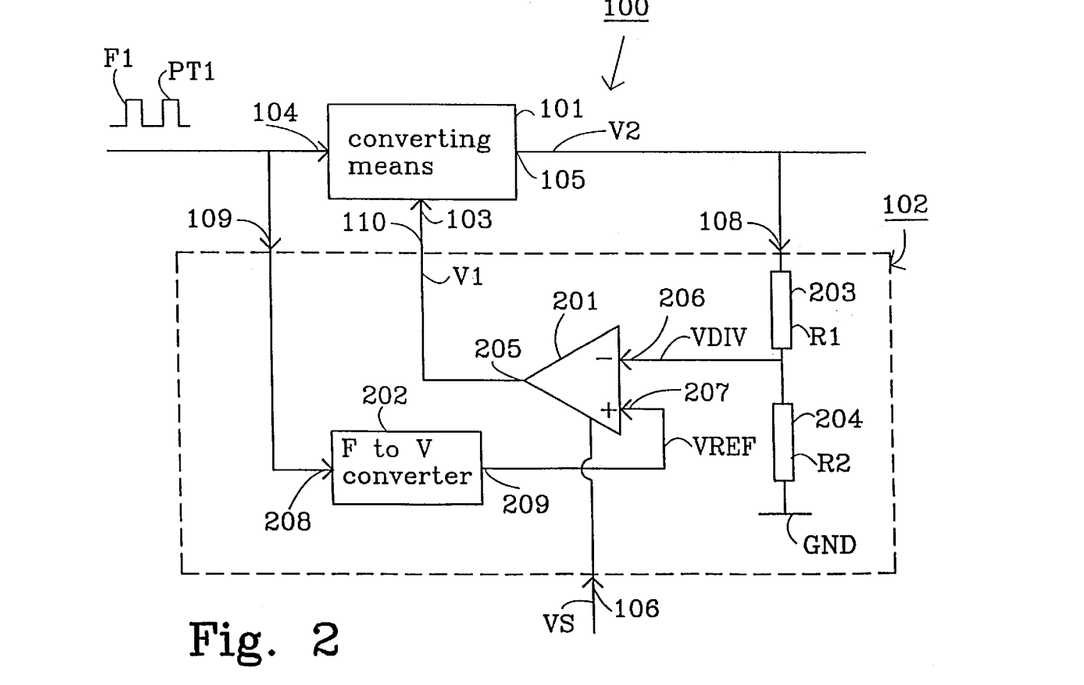
FIG. 2 is a more detailed block diagram of the arrangement according to FIG. 1.

FIG. 2 provides more details on the internal structure of the DC-to-DC converter 100 and in particular the internal structure of the regulating means 102.

The regulating means 102 comprises a differential amplifier 201, a frequency-to-voltage converter 202 and two resistors 203, 204 connected in series and having values R1 and R2 respectively.

The differential amplifier 201 has an output terminal 205, an inverting input terminal 206 and a non-inverting input terminal 207. The output terminal of the differential amplifier 201 is connected to the output terminal 110 of the regulating means 102.

The frequency-to-voltage converter 202 has an input terminal 208 and an output terminal 209. The converter input terminal 208 is connected to the input terminal 109 of the regulating means 102 and the converter output terminal 209 is connected to the non-inverting input terminal 207 of the differential amplifier 201.

The two resistors 203, 204 are connected between the second input terminal 108 of the regulating means 102 and ground GND. A point between the two resistors is connected to the inverting input 206 of the differential amplifier 201.

The frequency-to-voltage converter 202 generates said reference voltage VREF. In this embodiment, the generated reference voltage VREF is proportional to the frequency F1 of the first pulse train PT1 and this relation can thus be described as $$VREF = K*F1 \tag{1}$$

The two resistors 203, 204 acts as a voltage divider and provides, at said point between the two resistors 203, 204, a portion of the second DC-voltage V2. The relation between the portion VDIV and the second DC-voltage V2 can be expressed as $$VDIV = V2*R2/(R1+R2) \tag{2}$$

The second DC-voltage V2 emitted by the converting means 101 increases as the first DC-voltage V1 increases i.e. the second DC-voltage V2 expressed as a function of the first DC-voltage V1 has a positive derivative. The differential amplifier 201 has a sufficiently high amplification that the feed-back loop will force the voltage level VDIV at the inverting input terminal 206 towards the voltage level VREF applied to the non-inverting input terminal 207, i.e. the feed-back loop will try to keep the voltage difference $$VREF - VDIV = 0 \tag{3}$$

By combining equations (1), (2) and (3) the following approximative relationship between the second DC-voltage V2 and the frequency F1 of the first pulse train PT1 is found:

$$V2 = K*(R1+R2)/R2*F1 \tag{4}$$

Any variations of the load 120 in FIG. 1 will be compensated by the feed back loop in order to satisfy equation (4).

Figure 3:
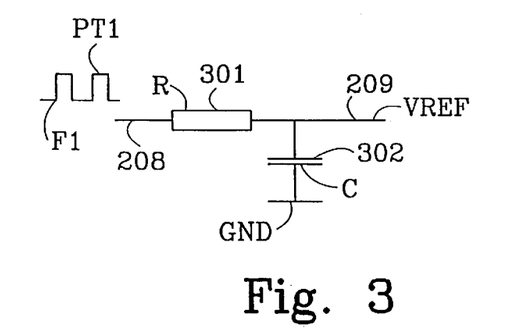
FIG. 3 is a block diagram of a simple frequency-to-voltage converter.

FIG. 3 shows a simple way of implementing the frequency-to-voltage converter 202 of FIG. 2. A resistor 301 and capacitor 302, with values R and C respectively, are connected in series between the input terminal 208 of the frequency-to-voltage converter 202 and ground GND. The output terminal 209 of the frequency-to-voltage converter 202 is connected to a point between the resistor 301 and capacitor 302. The circuit in FIG. 3 acts as an integrator.

Figure 6A:
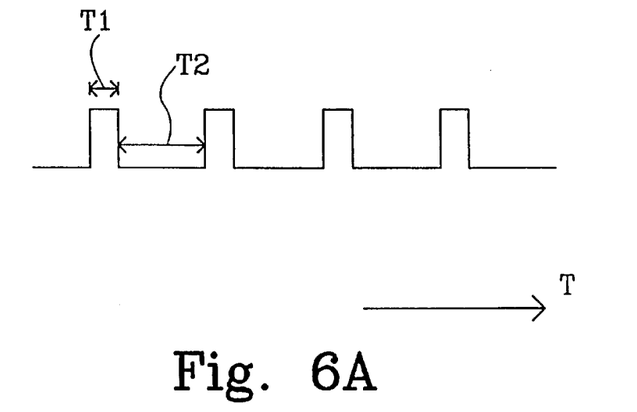
FIG. 6A is a time diagram illustrating a pulse train having a low frequency.
Figure 6B:
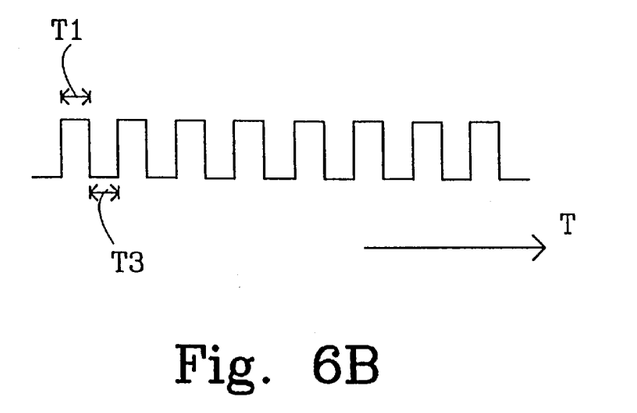
FIG. 6B is a time diagram illustrating a pulse train having a higher frequency.

The first pulse train PT1 is illustrated in the time diagrams FIG. 6A and FIG. 6B. In these time diagrams time has a common denotation T. In FIG. 6A each pulse has a pulse duration T1 and a pulse distance T2. In FIG. 6B each pulse has the same pulse duration T1 as in FIG. 6A, but the pulse distance T3 is shorter than in FIG. 6A. The pulse train has a frequency F1. For the pulse train PT1 a duty cycle DC1 can be defined as the relation between the pulse duration T1 and the pulse distance T2, e.g. DC1=T1/T2. The duty cycle DC1 has a lower value in FIG. 6A than in FIG. 6B.

If the characteristics of the first pulse train PT1 is such that the pulse duration, as illustrated in FIG. 6A and FIG. 6B, is not changed with a variation of the frequency F1 and the frequency F1 is much smaller than $1/(2\pi RC)$ the relationship according to equation (1) holds for the circuit in FIG. 3 and the constant K will be close to one.

The converting means 101 in FIG. 1 can be implemented in different ways.

Figures 4, 5:
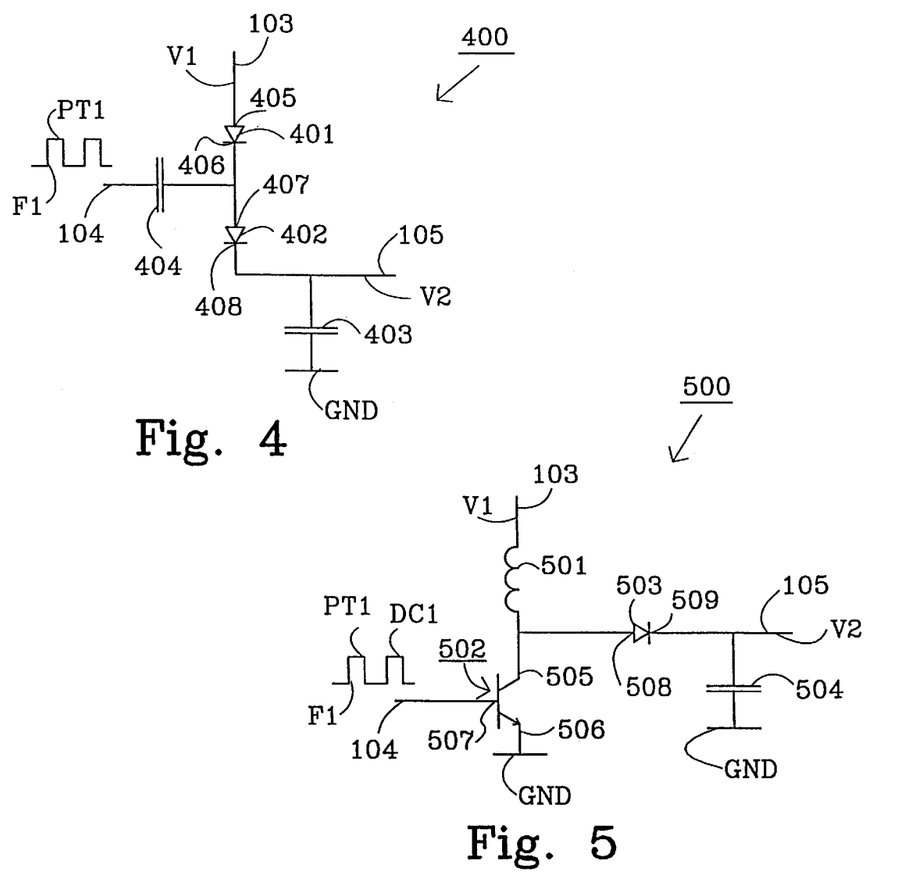
FIG. 4 is a block diagram of a capacitor based charge pump.
FIG. 5 is a block diagram of a coil based charge pump.

FIG. 4 illustrates an embodiment of the converting means comprising a capacitor based charge pump 400. The capacitor based charge pump 400 comprises a first diode 401 and a second diode 402, each having a cathode and an anode. The anode 405 of the first diode 401 is connected to the first input terminal 103 of the converting means, the cathode 406 of the first diode 401 is connected to the anode 407 of the second diode 402, the cathode 408 of the second diode is connected to one pole of a first capacitor 403 while the other pole of the first capacitor 403 is connected to ground GND. A second capacitor 404 is connected between the second input terminal 104 of the converting means and a point between the two diodes 401, 402. The output terminal 105 of the converting means is connected to a point between the second diode 402 and the first capacitor 403.

When a pulse in the pulse train PT1 arrives at the second input terminal 104, the voltage in the point between the diodes 401 and 402 is raised from the first voltage V1 (minus a diode forward bias) with the amplitude of PT1. If this voltage (minus a diode forward bias) exceeds the second voltage V2 over the first capacitor 403, then the first capacitor 403 is charged by a current flowing from the second capacitor 404 to the first capacitor 403.

When the trailing edge of the pulse reaches the second input terminal 104, the voltage in the point between the diodes 401 and 402 will be lowered. If the voltage fall below the first voltage V1 (minus a diode forward bias) then a current will flow from the source supplying the first voltage V1, i.e. the regulating means 102 in FIG. 2, to the capacitor 404.

This procedure will be repeated for each pulse in the pulse train PT1 resulting in the second voltage V2 over the first capacitor 403 being close to the sum of the first voltage V1 and the amplitude of the pulse train PT1, assuming a neglible load connected to the output terminal 105. The second voltage V2 is held constant at varying load by the feed back arrangement described in connection with FIG. 2.

FIG. 5 illustrates a second embodiment of the converting means comprising a coil based charge pump 500. The coil based charge pump 500 comprises an inductor 501, a transistor 502, a diode 503, and a capacitor 504. The transistor has a collector 505, an emitter 506 and a base 507. The diode has an anode 508 and a cathode 509. The inductor 501 is connected at one pole to the first input terminal 103 of the converting means and connected at the other pole to the collector 505 of the transistor 502. The emitter 506 of the transistor 502 is connected to ground GND. The base 507 of the transistor 502 is connected to the second input terminal 104 of the converting means. The anode of the diode 503 is connected to the collector 505 of the transistor 502, the cathode 509 of the diode 503 is connected to one pole of the capacitor 504 and the other pole of the capacitor 504 is connected to ground GND. The output terminal 105 of the converting means is connected to a point between the diode 503 and the capacitor 504.

When a positive pulse in the pulse train PT1 arrives at the second input terminal 104, the transistor 502 will open up and provide a low resistans connection between the inductor 501 and ground GND. As one end of the inductor 501 is connected to the first input terminal 103 on which the first (positive) voltage V1 is received from a source, i.e. the regulating means 102 in FIG. 2, a current will flow through the inductor 501 to ground GND.

When the trailing edge of the pulse reaches the second input terminal 104, the transistor 502 will close and cut off the current flowing through the transistor 502. The inductor 501 reacts by inducing a positive voltage at its pole connected to the diode 503. If this voltage exceeds the second voltage V2 over the capacitor 504 (minus a diode forward bias), then the capacitor 504 will be charged by a current from the inductor 501.

This procedure will be repeated for each pulse in the pulse train PT1, resulting in the second voltage V2 over the capacitor 504 that is higher than the first voltage V1. The second voltage V2 depends on the inductance value, the frequency F1 of the pulse train PT1 and the duty cycle DC1 of the pulse train PT1, as well as the load connected to the capacitor 504.

In the example of FIG. 1, the first pulse train PT1 is generated by a micro controller 121 having inherent support for generating a train of pulses. The pulse duration and pulse distance, e.g. T1 respective T2 in FIG. 6A, are set by writing appropriate values in specific registers of the micro controller 121.

Figure 8A:
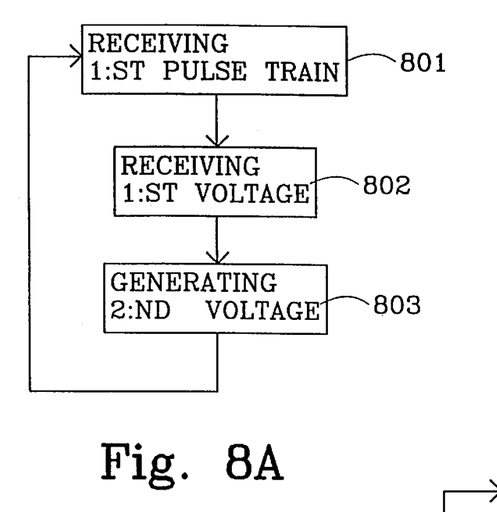
FIG. 8A–8B are flow charts illustrating the method steps carried out by the DC-to-DC converter in FIG. 1.
Figure 8B:
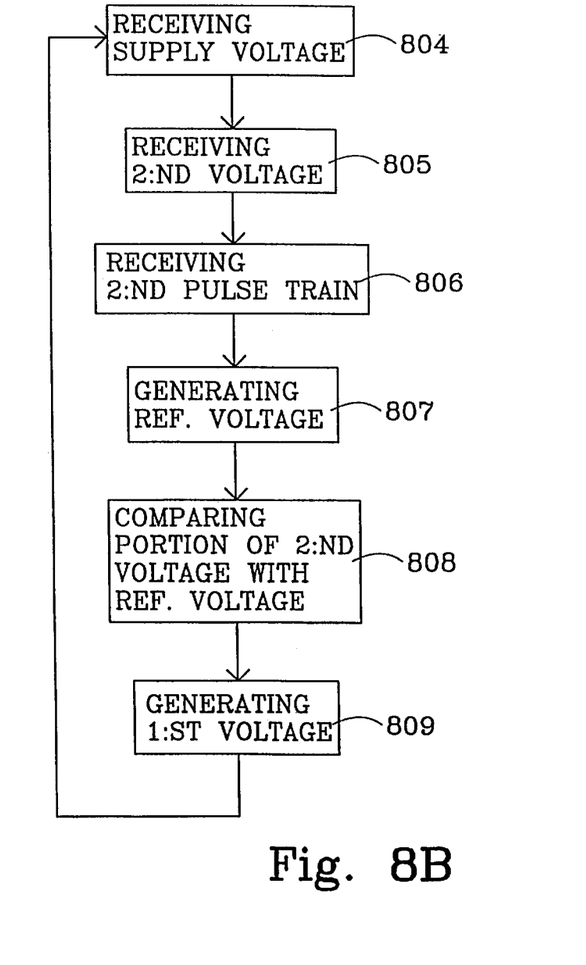

The flowcharts in FIG. 8A and FIG. 8B describes a method according to the invention such as carried out by the DC-to-DC converter 100 illustrated in FIG. 1 and FIG. 2.

FIG. 8A illustrates the method steps carried out in the converting means 101. In step 801 the first pulse train PT1 is received from the micro controller 121. The first DC-voltage V1 is received in step 802 from the regulating means 102. In step 803, the second DC-voltage V2 is generated as described previously. These method steps 801–803 are carried out repeatedly in the converting means 101.

FIG. 8B illustrates the method steps carried out in the regulating means 102. In step 804 the supply voltage VS is received from the DC-power source 107. In step 805 the second DC-voltage V2 is received from the converting means 101. In step 806 the second pulse train, in this particular embodiment being identical with the first pulse train, is received from the micro controller 121. In step 807 the reference voltage VREF is generated by the frequency-to-voltage converter 202. In step 808 the portion VDIV of the second DC-voltage V2 is compared with the reference voltage VREF generated in step 807 and in step 809 the result of this comparison is used when generating the first DC-voltage V1. These method steps 804–809 are carried out repeatedly in the regulating means 101.

The invention can be varied in a number of different ways.

The converting means 101 can be implemented in several other ways than those disclosed in FIG. 4 and FIG. 5. In all these different embodiments of the converting means 101 the converting means 101 is arranged such that the generated second DC-voltage V2 depends on both the first DC-voltage V1 and at least one characteristic of the first pulse train PT1 and that the second DC-voltage V2 is a monotonic function of the first DC-voltage V1.

Figure 7:
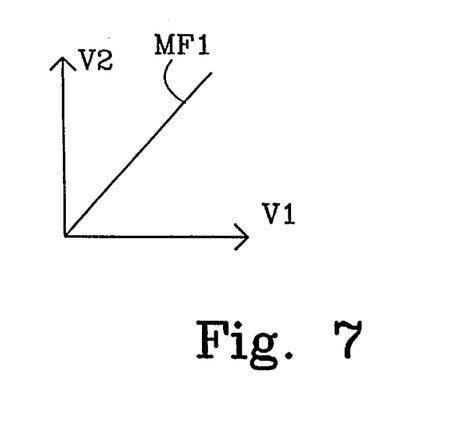
FIG. 7 is a function diagram illustrating an increasing function

FIG. 7 provides an example of a monotonic function MF1, i.e. the function never decreases or never increases as the independent variable increases. In this particular example V2 is an increasing function of V1. More precisely V2 is a linear function of V1 having a positive derivative.

In the capacitor based charge pump 400 of FIG. 4, the generated second DC-voltage V2 depends on both the frequency and amplitude of the first pulse train PT1. In the coil based charge pump 500 of FIG. 5, the generated second DC-voltage depends on both the frequency and duty cycle of the first pulse train PT1. In both charge pumps 400, 500, the generated second DC-voltage V2, when considered as a function of the first DC-voltage V1, increases as the received first DC-voltage V1 is increased. For both charge pumps 400, 500 the second DC-voltage V2 expressed as a function of the first DC-voltage V1 is approximately a linear function having a positive derivative. Thus the function MF1 in FIG. 7 can serve as an illustration of how the second DC-voltage V2 depends on the first DC-voltage V1 for both the capacitor based charge p,ump 400 and the coil based charge pump 500.

The regulating means 102 can also be implemented in several different ways. For some of these embodiments, the internal structure of the regulating means 102 corresponds to that of FIG. 2, while other embodiments do not necessarily need to have an internal structure corresponding to that of FIG. 2.

The differential amplifier 201 in FIG. 2 can be implemented in different ways. The differential amplifier 201 must be able to supply sufficient power to the converting means 101.

If the amplifier 201 is implemented as an integrated circuit it may be necessary to add a discrete transistor output stage to handle the heat dissipation. The power dissipation in the differential amplifier 201 is kept to a minimum by chosing an appropriate working point for the differential amplifier 201. This is achieved by selecting an appropriate reference voltage level VREF and selecting the two resistors 203 and 204 so that a matching voltage division of V2 is achieved.

Instead of a differential amplifier controlling the first DC-voltage emitted by the regulating means, a comparator could be used for the same purpose.

The frequency-to-voltage converter 202 in FIG. 2 can be implemented in other ways apart from that shown in FIG. 3. Instead of generating the reference voltage by means of a frequency-to-voltage converter, some other kind of reference voltage generating means can be used. In all different embodiments of the reference voltage generating means the generated reference voltage depends on at least one characteristic, e.g. the frequency or duty cycle, of the second pulse train received by the regulating means.

Even though FIG. 6A and FIG. 6B only discloses rectangular pulses the invention is not limited to only be used in connection with pulse trains having rectangular pulses. However, a pulse train with rectangular pulses is very easy to generate and if the converting means is implemented according to FIG. 5 it is preferred to have very sharp pulse edges since this enables the transistor, acting as a switch, to work efficiently.

It is also not a necessary requirement that the first pulse train, received by the converting means, and the second pulse train, received by the regulating means, are identical. However it is easier to only provide one pulse train.

What is claimed is:

1. A DC-to-DC converter comprising:
    converting means having a first input terminal for receiving a first DC-voltage and an output terminal on which the converting means emits a second DC-voltage, the converting means further having a second input terminal for receiving a first pulse train, the converting means being arranged such that the generated second DC-voltage depends on both the first DC-voltage and at least one characteristic of the first pulse train and that the second DC-voltage is a monotonic function of the first DC-voltage;
    regulating means, wherein the regulating means includes:
        a first input terminal for receiving a supply voltage from a DC-power source;
        a second input terminal connected to the output terminal of the converting means;
        an output terminal connected to the first input terminal of the converting means, the regulating means emitting said first DC-voltage determined in the regulating means by a comparison of a portion of the second DC-voltage with a reference voltage whereby said first DC-voltage is generated such that the portion of the second DC-voltage is forced towards the reference voltage level;
        a third input terminal for receiving a second pulse train; and
        a reference voltage generating means being arranged to generate the reference voltage depending on at least one characteristic of the second pulse train.

2. The DC-to-DC converter according to claim 1 characterized by the DC-to-DC converter being arranged such that said second pulse train is essentially identical with said first pulse train.

3. The DC-to-DC converter according to claim 1 characterized by said converting means being arranged such that said at least one characteristic of the first pulse train on which said generated second DC-voltage depends is the frequency.

4. The DC-to-DC converter according to claim 1 characterized by said converting means being arranged such that said at least one characteristic of the first pulse train on which said generated second DC-voltage depends is the duty cycle.

5. The DC-to-DC converter according to claim 1 characterized by said reference voltage generating means being arranged such that said at least one characteristic of the second pulse train on which said generated reference voltage depends is the frequency.

6. The DC-to-DC converter according to claim 1 characterized by said reference voltage generating means being arranged such that said at least one characteristic of the second pulse train on which said generated reference voltage depends is the duty cycle.

7. The DC-to-DC converter according to claim 1 characterized by the DC-to-DC converter being arranged such that said second DC-voltage has an absolute value greater than the absolute value of said supply voltage.

8. The DC-to-DC converter according to claim 1 characterized by said converting means comprising a capacitor based charge pump.

9. The DC-to-DC converter according to claim 1 characterized by said converting means comprising a coil based charge pump.

10. The DC-to-DC converter according to claim 1 wherein said regulating means further comprises:

a differential amplifier having an output terminal, an inverting input terminal and a non-inverting input terminal, the output terminal of the differential amplifier being connected to the output terminal of the regulating means; and wherein said reference voltage generating means comprises a frequency-to-voltage converter having an input terminal and an output terminal, the input terminal of the frequency-to-voltage converter being connected to the third input terminal of the regulating means and the frequency-to-voltage converter on its output terminal, connected to the non-inverting input terminal of the differential amplifier, emitting said reference voltage; and a pair of resistors connected in series, the resistors being connected between said second input terminal of the regulating means and a predetermined potential, a point between the pair of resistors being connected to the inverting input terminal of the differential amplifier and the resistors thus determining said portion of said second DC-voltage.

11. A method for controlling a second DC-voltage emitted by a DC-to-DC converter, the DC-to-DC converter comprising converting means and regulating means, said method comprising the steps of:

a) receiving in the converting means a first pulse train;

b) receiving in the converting means a first DC-voltage;

c) generating the second DC-voltage in the converting means such that the second DC-voltage depends on both the first DC-voltage and at least one characteristic of the first pulse train and that the second DC-voltage is a monotonic function of the first DC-voltage;

d) receiving in the regulating means a supply voltage from a DC-power source;

e) receiving in the regulating means the second DC-voltage;

f) receiving in the regulating means a second pulse train;

g) generating in the regulating means reference voltage such that the reference voltage is depending on at least one characteristic of the second pulse train;

h) comparing in the regulating means a portion of the second voltage with the reference voltage; and i) generating the first DC-voltage in the regulating means based on the comparison in step h) such, that the portion of the second DC-voltage is forced towards the reference voltage level.

12. The method according to claim 11 wherein said second pulse train is essentially identical with said first pulse train.

13. The method according to claim 11 characterized by said at least one characteristic of the first pulse train on which said generated second DC-voltage depends is the frequency.

14. The method according to claim 11 characterized by that said at least one characteristic of the first pulse train on which said generated second DC-voltage depends is the duty cycle.

15. The method according to claim 11 characterized by said at least one characteristic of the second pulse train on which said generated reference voltage depends is the frequency.

16. The method according to claim 11 characterized by said at least one characteristic of the second pulse train on which said generated reference voltage depends is the duty cycle.

17. The method according to claims 11 characterized by said second DC-voltage is generated in step c) such that it has an absolute value greater than the absolute value of said supply voltage.

* * * * *

UNITED STATES PATENT AND TRADEMARK OFFICE
CERTIFICATE OF CORRECTION

PATENT NO. : 5,939,866
DATED : August 17, 1999
INVENTOR(S) : Björkengren

Page 1 of 1

It is certified that error appears in the above-identified patent and that said Letters Patent is hereby corrected as shown below:

Title page,
Item [54], replace "Preregulated" with -- Method and Arrangement in a --

Column 1,
Line 28, replace "a:" with -- as --

Column 2,
Line 19, replace "first." with -- first --
Line 41, after "means," delete -- is --

Column 3,
Line 25, replace "111" with -- 111, --

Column 7,
Line 2, replace "p, ump" with -- pump --

Signed and Sealed this

Sixteenth Day of October, 2001

Attest:

NICHOLAS P. GODICI
Attesting Officer
Acting Director of the United States Patent and Trademark Office